United States Patent
Uozumi et al.

(10) Patent No.: US 11,219,891 B1
(45) Date of Patent: Jan. 11, 2022

(54) METHOD FOR MANUFACTURING SOLID CATALYST COMPONENT FOR POLYMERIZATION OF OLEFIN, METHOD FOR MANUFACTURING CATALYST FOR POLYMERIZATION OF OLEFIN, AND METHOD FOR MANUFACTURING POLYMER OF OLEFIN

(71) Applicant: TOHO TITANIUM CO., LTD., Chigasaki (JP)

(72) Inventors: Toshiya Uozumi, Chigasaki (JP); Teppei Ishikawa, Chigasaki (JP)

(73) Assignee: TOHO TITANIUM CO., LTD., Chigasaki (JP)

( * ) Notice: Subject to any disclaimer, the term of this patent is extended or adjusted under 35 U.S.C. 154(b) by 0 days.

(21) Appl. No.: 17/084,752

(22) Filed: Oct. 30, 2020

(51) Int. Cl.
*B01J 37/04* (2006.01)
*C08F 10/06* (2006.01)
*B01J 35/02* (2006.01)

(52) U.S. Cl.
CPC ............... *B01J 37/04* (2013.01); *B01J 35/02* (2013.01); *C08F 10/06* (2013.01)

(58) Field of Classification Search
CPC ............. B01J 37/04; B01J 35/02; C08F 10/06

USPC .......................................................... 502/152
See application file for complete search history.

(56) References Cited

U.S. PATENT DOCUMENTS

2019/0023820 A1* 1/2019 Kono .................... C08F 110/06

FOREIGN PATENT DOCUMENTS

| JP | 2001-503079 A | 3/2001 |
| JP | 2010-43267 A | 2/2010 |

* cited by examiner

*Primary Examiner* — William K Cheung
(74) *Attorney, Agent, or Firm* — Westerman, Hattori, Daniels & Adrian, LLP

(57) ABSTRACT

A method for manufacturing a solid catalyst component for polymerization of an olefin is disclosed, which includes bringing a magnesium compound and a specific styrene-based compound into contact with each other to obtain a preliminary contact product, and subsequently bringing the preliminary contact product, a titanium halide compound, and an internal electron donor compound into contact with each other to obtain a solid catalyst component for polymerization of an olefin; and a method for manufacturing a catalyst for polymerization of an olefin and a method for manufacturing a polymer of an olefin using the solid catalyst component for polymerization of an olefin obtained by the manufacturing method.

5 Claims, No Drawings

METHOD FOR MANUFACTURING SOLID CATALYST COMPONENT FOR POLYMERIZATION OF OLEFIN, METHOD FOR MANUFACTURING CATALYST FOR POLYMERIZATION OF OLEFIN, AND METHOD FOR MANUFACTURING POLYMER OF OLEFIN

TECHNICAL FIELD

The present invention relates to a method for manufacturing a solid catalyst component for polymerization of an olefin, a method for manufacturing a catalyst for polymerization of an olefin, and a method for manufacturing a polymer of an olefin.

BACKGROUND ART

Conventionally, polymerization of an olefin such as propylene has been carried out using a solid catalyst for polymerization of an olefin (also referred to as a "solid catalyst"), and a polymer of an olefin thus obtained have been utilized for various applications such as containers and films besides molded articles for automobile parts, home appliance parts, and the like, with the polymer of an olefin melted and subsequently molded by various molding machines, stretching machines, and the like.

As such a solid catalyst, one obtained by bringing a solid catalyst component for polymerization of an olefin (also referred to as a "solid catalyst component") which is prepared from a magnesium compound, a titanium halide compound, and an electron donor compound; an organic aluminum compound; and an organic silicon compound into contact with each other is known, and a number of manufacturing methods thereof have also been proposed.

For example, Patent Literature 1 describes a solid catalyst component containing two types of internal electron donor compounds including a weakly soluble type and a strongly soluble type.

In addition, Patent Literature 2 proposes a solid catalyst component in which a bifunctional electron donor compound ED selected from a diester, a diketone, a diamine, and a diether and a monofunctional electron donor MD selected from an ether, an ester, an amine, and a ketone are contained in a Mg dihalide at a quantitative ratio of larger than 30 in terms of a mole ratio of ED/MD so as to impart high activity and stereospecificity to a solid catalyst when the solid catalyst is used for (co)polymerizing propylene or a higher alpha-olefin.

CITATION LIST

Patent Literature

[Patent Literature 1]
Japanese Translation of PCT International Application Publication No. 2001-503079
[Patent Literature 2]
Japanese Patent Laid-Open No. 2010-43267

SUMMARY OF INVENTION

Technical Problem

However, the present inventor et al. have studied to find that in the solid catalyst component described in Patent Literature 1, since two types of internal electron donor compounds including a weakly soluble type and a strongly soluble type are simultaneously allowed to contact and react, the weakly soluble internal electron donor compound is likely to be preferentially contained, polymer properties originating from the strongly soluble internal electron donor compound are hard to be exerted, and properties of a polymer obtained are difficult to control.

In addition, it has been found that in the solid catalyst component described in Patent Literature 2, since the monofunctional electron donor, which is an internal electron donor compound, decreases stereospecificity of the solid catalyst component, stereoregularity of a polymer obtained by using such a solid catalyst component is also decreased.

Under such circumstances, the present invention aims at providing a method for manufacturing a solid catalyst component for polymerization of an olefin having excellent polymerization activity and capable of manufacturing a polymer excellent in stereospecificity, a method for manufacturing a solid catalyst for polymerization of an olefin, and a method for manufacturing a polymer of an olefin.

Solution to Problem

The present inventor et al. have made intensive studies on manufacturing conditions of a solid catalyst component so as to solve the above-described technical problem and consequently found that the above problem can be solved by preliminarily bringing a specific compound into contact with a magnesium compound. The present invention has been completed based on such a finding.

That is, the present invention provides (1) to (4) below.

(1) A method for manufacturing a solid catalyst component for polymerization of an olefin, including: bringing a magnesium compound and a compound represented by general formula (I) below into contact with each other to obtain a preliminary contact product; and subsequently bringing the preliminary contact product, a titanium halide compound, and an internal electron donor compound into contact with each other to obtain a solid catalyst component for polymerization of an olefin,

[Formula 1]

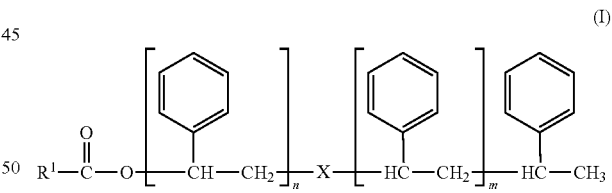

(I)

wherein, $R^1$ is any group selected from a linear alkyl group having 1 to 8 carbon atoms, a branched alkyl group having 3 to 8 carbon atoms, a cycloalkyl group having 3 to 8 carbon atoms, and an aromatic group having 6 to 12 carbon atoms, n and m each are an integer of 0 or more, n+m is 1 to 30,000, and X is a polymerization unit having a structural unit (A) below and a structural unit (B) below and having 9 to 50,000 carbon atoms in total.

[Formula 2]

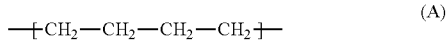

(A)

[Formula 3]

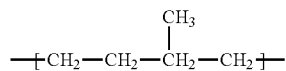
(B)

(2) A method for manufacturing a catalyst for polymerization of an olefin, including bringing a solid catalyst component for polymerization of an olefin obtained by the method described in (1) above and an organic aluminum compound represented by general formula (II) below into contact with each other:

 (II)

wherein, $R^2$ is an alkyl group having 1 to 6 carbon atoms, Q is a hydrogen atom or a halogen atom, p is a real number satisfying $0 < p \leq 3$, when two or more $R^2$ exist, each $R^2$ may be the same or different from each other, and when two or more Q exist, each Q may be the same or different from each other.

(3) The method for manufacturing a catalyst for polymerization of an olefin described in (2) above, including: bringing a solid catalyst component for polymerization of an olefin obtained by the method described in (1) above, an organic aluminum compound represented by general formula (II) below, and an external electron donor compound into contact with each other:

 (II)

wherein, $R^2$ is an alkyl group having 1 to 6 carbon atoms, Q is a hydrogen atom or a halogen atom, p is a real number satisfying $0 < p \leq 3$, when two or more $R^2$ exist, each $R^2$ may be the same or different from each other, and when two or more Q exist, each Q may be the same or different from each other.

(4) A method for manufacturing a polymer of an olefin, including: polymerizing an olefin using a catalyst for polymerization of an olefin obtained by the method described in (2) or (3) above.

Advantageous Effects of Invention

According to the present invention, a method for manufacturing a solid catalyst component for polymerization of an olefin having excellent polymerization activity and capable of manufacturing a polymer excellent in stereospecificity, a method for manufacturing a catalyst for polymerization of an olefin, and a method for manufacturing a polymer of an olefin can be provided.

DESCRIPTION OF EMBODIMENTS

First, a method for manufacturing a solid catalyst component for polymerization of an olefin according to the present invention (hereinafter, appropriately referred to as the "solid catalyst component") will be described.

The method for manufacturing a solid catalyst component for polymerization of an olefin according to the present invention includes bringing a magnesium compound and a compound represented by general formula (I) below into contact with each other to obtain a preliminary contact product, and subsequently bringing the preliminary contact product, a titanium halide compound, and an internal electron donor compound into contact with each other to obtain a solid catalyst component for polymerization of an olefin,

[Formula 4]

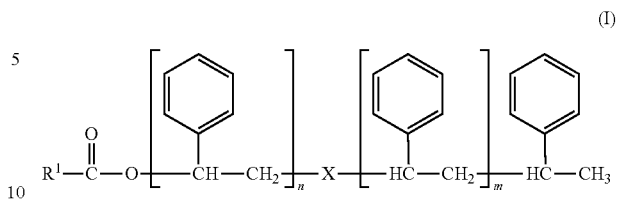 (I)

wherein, $R^1$ is any group selected from a linear alkyl group having 1 to 8 carbon atoms, a branched alkyl group having 3 to 8 carbon atoms, a cycloalkyl group having 3 to 8 carbon atoms, and an aromatic group having 6 to 12 carbon atoms, n and m each are an integer of 0 or more, n+m is 1 to 30,000, and X is a polymerization unit having a structural unit (A) below and a structural unit (B) below and having 9 to 50,000 carbon atoms in total.

[Formula 5]

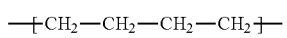 (A)

[Formula 6]

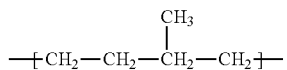 (B)

In the method for manufacturing a solid catalyst component for polymerization of an olefin according to the present invention, the magnesium compound is not particularly limited as long as it is a conventionally known magnesium compound.

Examples of the magnesium compound can include one or more kinds selected from a magnesium dihalide, a dialkylmagnesium, an alkylmagnesium halide, a dialkoxy magnesium, a diaryloxy magnesium, an alkoxy magnesium halide, a fatty acid magnesium, and the like.

Among these magnesium compounds, a magnesium dihalide, a mixture of a magnesium dihalide and a dialkoxy magnesium, and a dialkoxy magnesium are preferable, and a dialkoxy magnesium is especially preferable.

Specifically, the dialkoxy magnesium includes one or more kinds selected from dimethoxymagnesium, diethoxymagnesium, dipropoxymagnesium, dibutoxymagnesium, ethoxymethoxymagnesium, ethoxypropoxymagnesium, and butoxyethoxymagnesium, and diethoxymagnesium is especially preferable among them.

Examples of a method for manufacturing a dialkoxy magnesium can include methods exemplified in Japanese Patent Laid-Open No. 58-4132, Japanese Patent Laid-Open No. 62-51633, Japanese Patent Laid-Open No. 3-74341, Japanese Patent Laid-Open No. 4-368391, Japanese Patent Laid-Open No. 8-73388, and the like.

In the method for manufacturing a solid catalyst component for polymerization of an olefin according to the present invention, the magnesium compound and the compound represented by general formula (I) below are brought into contact with each other to obtain a preliminary contact product.

[Formula 7]

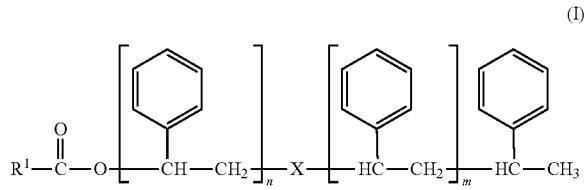

In the compound represented by general formula (I), $R^1$ above is any group selected from a linear alkyl group having 1 to 8 carbon atoms, a branched alkyl group having 3 to 8 carbon atoms, a cycloalkyl group having 3 to 8 carbon atoms, and an aromatic group having 6 to 12 carbon atoms.

When $R^1$ is a linear alkyl group having 1 to 8 carbon atoms, examples of $R^1$ can include methyl group, ethyl group, propyl group, butyl group, pentyl group, hexyl group, heptyl group, octyl group, and the like.

When $R^1$ is a branched alkyl group having 3 to 8 carbon atoms, examples of $R^1$ can include, iso-propyl group, iso-butyl group, sec-butyl group, tert-butyl group, iso-pentyl group, neopentyl group, sec-pentyl group, tert-pentyl group, 3-methylhexyl group, 2-ethylhexyl group, and the like.

When $R^1$ is a cycloalkyl group having 3 to 8 carbon atoms, examples of $R^1$ can include cyclopropyl group, methyl cyclopropyl group, ethyl cyclopropyl group, cyclobutyl group, methyl cyclobutyl group, ethyl cyclobutyl group, cyclopentyl group, methyl cyclopentyl group, ethyl cyclopentyl group, cyclohexyl group, methyl cyclohexyl group, ethyl cyclohexyl group, cycloheptyl group, methyl cycloheptyl group, cyclooctyl group, and the like.

When $R^1$ is an aromatic group having 6 to 12 carbon atoms, $R^1$ can include phenyl group, methylphenyl group, ethylphenyl group, benzyl group, naphthyl group, biphenyl group, and the like.

$R^1$ is preferably an aromatic group having 6 to 12 carbon atoms and is more preferably phenyl group.

In the compound represented by general formula (I), n and m each are an integer of 0 or more. In addition, n+m is 1 to 30,000, preferably 2 to 20,000, more preferably 2 to 10,000, still more preferably 10 to 5,000, further preferably 50 to 1,000, and still further preferably 100 to 500.

In the compound represented by general formula (I), X is a polymerization unit having a structural unit (A) below and a structural unit (B) below and having 9 to 50,000 carbon atoms in total.

[Formula 8]

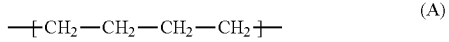

(A)

[Formula 9]

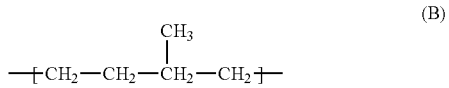

(B)

In the compound represented by general formula (I), X has 9 to 50,000 carbon atoms in total, preferably 9 to 25,000, more preferably 9 to 10,000, and still more preferably 9 to 5,000.

In the method for manufacturing a solid catalyst component for polymerization of an olefin according to the present invention, the structure of the compound represented by general formula (I) can be determined by analysis using gel permeation chromatography (GPC), a nuclear magnetic resonance device ($^1$H-NMR, $^{13}$C-NMR), and Fourier transform infrared spectroscopy (FT-IR).

That is, the number average molecular weight (Mn) of the compound represented by general formula (I) is determined by gel permeation chromatography (GPC).

In addition, partial structures such as kinds of respective substituents or structural units are determined and the whole structure is estimated based on the position of each peak detected by a 1H-NMR spectrum, the spectrum strength at the position, and peaks appearing at certain wavelength regions in an FT-IR spectrum.

Thereafter, the polymerization number of each structural unit constituting the compound represented by general formula (I) is determined based on peak positions detected by a $^{13}$C-NMR spectrum and the spectrum strength at these positions (based on the peak strength ratio of each peak).

Then, the molecular structure of the compound represented by general formula (I) is determined, taking these results together (it is to be noted that, when the kinds of substituents can be determined by the above-described 1H-NMR spectrum, FT-IR spectrum measurement is not always needed).

In the present application document, respective analysis conditions at the time of conducting GPC analysis, 1H-NMR analysis, FT-IR analysis, and $^{13}$C-NMR analysis described above are as follows.

[GPC Analysis]

A number average molecular weight (Mn) was obtained from results measured under the following conditions using gel permeation chromatography (GPC) (HLC-8321 (GPC/HT)) manufactured by Tosoh Corporation.

Solvent: o-dichlorobenzene (ODCB)
Temperature: 140° C.
Column: GMHHR-H (20) HT×1, GMHHR-H (S) HT2×1
Sample concentration: 0.5 mg/mL (4 mL/8 mL—ODCB)
Injection volume: 0.5 mL
Flow rate: 1.0 mL/min The number average molecular weight (Mn) was calculated from a retention time obtained through GPC measurement based on a calibration curve showing correlation between retention times and number average molecular weights (Mn) obtained using standard polystyrene.

[$^1$H-NMR Analysis]
Measurement device: ECA400 (1H resonance frequency 400 MHz) manufactured by JEOL Ltd. (JEOL)
Measurement solvent: CDCl$_3$
Number of scans: 20 times
Measurement temperature: 20° C.
Internal standard: tetramethylsilane (TMS)

[Ft-Ir Analysis]
Measurement device: Avatar manufactured by Thermo Fisher Scientific K.K.
Measurement method: transmission method after film preparation
Measurement temperature: room temperature (20° C.)

[$^{13}$C-NMR Analysis]
Measurement device: ECA400 ($^{13}$C resonance frequency 100 MHz) manufactured by JEOL Ltd. (JEOL)
Measurement solvent: CDCl$_3$
Number of scans: 5,000 times
Measurement temperature: 20° C.
Internal standard: tetramethylsilane (TMS)

It is thought that in the method for manufacturing a solid catalyst component for polymerization of an olefin according to the present invention, excessive adsorption of the internal electron donor compound may be suppressed by preliminarily bringing the specific compound represented by general formula (I) into contact with the magnesium compound, which is a carrier.

That is, it is though that although the internal electron donor compound has higher adsorptivity to the magnesium compound than the specific compound represented by general formula (I), by virtue of preliminarily bringing the specific compound represented by general formula (I) into contact with the magnesium compound, when the magnesium compound and the internal electron donor compound are brought into contact with each other, the specific compound represented by general formula (I) serves as a protecting agent to suppress excessive adsorption of the internal electron donor compound to the magnesium carrier, allowing polymerization properties originating from the internal electron donor compound to be effectively maintained.

It is though that in the method for manufacturing a solid catalyst component for polymerization of an olefin according to the present invention, by virtue of preliminarily bringing the specific compound represented by general formula (I) into contact with the magnesium compound, especially when two or more types of internal electron donor compounds having different adsorptivity to the magnesium compound, which is a carrier, are used, an internal electron donor compound with weak solubility (strong adsorptivity) may be prevented from excessively adsorbing.

That is, it is thought that by virtue of preliminarily bringing the magnesium compound, which is a carrier, and the compound represented by general formula (I) into contact with each other at the time of manufacturing the solid catalyst component, the compound represented by general formula (I) serves as a protecting agent for adsorption sites of the internal electron donor compound in the carrier to inhibit excessive adsorption of the internal electron donor compound with weak solubility (strong adsorptivity) to the carrier, and especially when two or more types of internal electron donor compounds are used, an adsorption amount of the internal electron donor compound to the carrier can be consequently adjusted.

It is thought that the compound represented by general formula (I) has a faster adsorption rate to the carrier than each electron donor compound, can block adsorption of the internal electron donor compound with weak solubility (strong adsorptivity) for a certain time as well as has a property of separating from the carrier after a lapse of a certain time so as not to block adsorption of an internal electron donor compound with strong solubility (weak adsorptivity), and preferably serves as the protecting agent described above.

In the method for manufacturing a solid catalyst component for polymerization of an olefin according to the present invention, a contact amount of the compound represented by general formula (I) with respect to the magnesium compound (amount of compound represented by general formula (I)/amount of magnesium compound) is preferably 0.001 to 0.500, more preferably 0.005 to 0.350, and still more preferably 0.050 to 0.200 on a mass basis when the magnesium compound and the compound represented by general formula (I) are preliminarily contacted.

When the contact amount of the compound represented by general formula (I) described above falls within the above range, the content ratio of the internal electron donor compound with strong solubility (weak adsorptivity) in the solid catalyst component can be easily controlled so as to be within a desired range.

In the method for manufacturing a solid catalyst component for polymerization of an olefin according to the present invention, a contact temperature is preferably −20° C. to 50° C., more preferably −10° C. to 40° C., and still more preferably 0° C. to 30° C. when the magnesium compound and the compound represented by general formula (I) are preliminarily contacted.

In the method for manufacturing a solid catalyst component for polymerization of an olefin according to the present invention, a contact time is preferably 3 to 360 minutes, more preferably 5 to 240 minutes, and still more preferably 5 to 120 minutes when the magnesium compound and the compound represented by general formula (I) are preliminarily contacted.

A method for preliminarily contacting the magnesium compound and the compound represented by general formula (I) can include a method in which the magnesium compound and the compound represented by general formula (I) are mixed and stirred in the presence of an organic solvent inactive against both compounds.

In the method for manufacturing a solid catalyst component for polymerization of an olefin according to the present invention, the preliminary contact product of the magnesium compound and the compound represented by general formula (I), a titanium halide compound, and an internal electron donor compound are brought into contact with each other.

In the method for manufacturing a solid catalyst component for polymerization of an olefin according to the present invention, the titanium halide compound is not particularly limited as long as it is a quaternary titanium halide compound and is conventionally known.

Examples of the titanium halide compound can include one or more kinds selected from a titanium tetrahalide, an alkoxytitanium halide, and the like.

Such a titanium halide compound includes a titanium tetrahalide or an alkoxytitanium halide represented by general formula (III) below:

$$\text{Ti}(\text{OR}^3)_i Y_{4-i} \tag{III}$$

wherein, $R^3$ represents a hydrocarbon group having 1 to 10 carbon atoms, Y is a halogen atom, when two or more Y exist, each Y may be the same or different from each other, and i is an integer of 0 to 3.

As the titanium halide compound, titanium tetrahalides such as titanium tetrachloride, titanium tetrabromide, and titanium tetraiodide are preferable, and titanium tetrachloride is more preferable.

In the method for manufacturing a solid catalyst component for polymerization of an olefin according to the present invention, the internal electron donor compound is not particularly limited as long as it is an organic compound capable of donating an electron pair during preparing the solid catalyst component, with the functional group for donating the electron pair containing an oxygen atom or a nitrogen atom.

In addition, one kind of the internal electron donor compound may be used alone, or two or more kinds thereof may be used in combination. When two or more kinds of internal electron donor compounds are used in combination, examples thereof can include two or more kinds of internal electron donor compounds having adsorptivity to the magnesium compound different from each other.

Strength and weakness of adsorptivity of an internal electron donor compound to the magnesium compound can be determined according to the magnitude of an amount of the internal electron donor compound remaining in each solid catalyst component (an amount of the internal electron donor compound in the solid catalyst component) when the solid catalyst component is prepared using a stirred matter in which 20 g of a magnesium compound to be used for preparing the solid catalyst component is stirred in 60 mL of toluene and the same molar amount of each internal donor compound stirred at a temperature of −6° C. under the same conditions for every internal electron donor compound, with only the internal electron donor compound used changed.

That is, in each solid catalyst component, it can be defined as follows: the larger the remaining amount of the internal electron donor compound is, the stronger the adsorptivity thereof is, and the smaller the remaining amount of the internal electron donor compound is, the weaker the adsorptivity thereof is.

The amount of the internal electron donor compound in the solid catalyst component described above can be determined by hydrolyzing a solid catalyst, subsequently extracting the internal electron donor compound using an aromatic solvent, and subjecting this solution to measurement using a gas chromatography flame ionization detector (FID, hydrogen flame ionization type detector) method as described later.

In the method for manufacturing a solid catalyst component for polymerization of an olefin according to the present invention, the internal electron donor compound may be a phthalic ester compound or may be a compound other than phthalic ester compounds (non-phthalate compound).

The above-described phthalic ester compound is a compound having the following phthalic ester structure.

[Formula 10]

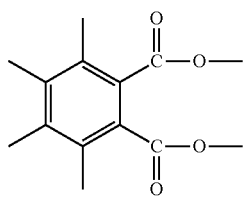

Such a phthalic ester compound is a compound represented by general formula (IV) below:

[Formula 11]

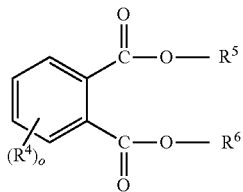

(IV)

wherein, $R^4$, $R^5$, and $R^6$ are organic groups, and O is an integer of 0 to 4. When two or more $R^4$ exist, each $R^4$ may be the same or different from each other, and $R^4$, $R^5$, and $R^6$ may be the same or different from one another.

Specifically, the phthalic ester compound includes di-n-propyl phthalate, diethyl phthalate, di-normal-butyl phthalate, diisobutyl phthalate, and the like.

The non-phthalate compound is a compound not having the above-described phthalic ester structure within its molecular and does not fall into phthalic ester compounds such as the compound represented by general formula (IV).

Examples of the non-phthalate compound can include one or more kinds selected from a diether compound, an ether carbonate compound, an aliphatic dicarboxylic acid ester compound, an ether-carboxylic acid ester compound, a dicarbonate compound, and the like.

Specifically, these non-phthalate compounds include one or more kinds selected from diethyl maleate, diethyl benzylidenemalonate, diethyl 2,3-diisopropylsuccinate, diethyl cyclohexane-1,2-dicarboxylate, cyclohexane-1,2-dicarboxylic acid di-n-propyl, cyclohexane-1,2-dicarboxylic acid di-n-butyl, diethyl cyclohexene-1,2-dicarboxylate, cyclohexene-1,2-dicarboxylic acid di-n-propyl, cyclohexene-1,2-dicarboxylic acid di-n-butyl, ethyl 3-ethoxy-2-isopropylpropionate, ethyl 3-ethoxy-2-t-butylpropionate, ethyl 3-ethoxy-2-t-pentylpropionate, 2,4-pentanediol dibenzoate, 3-methyl-2,4-pentanediol dibenzoate, 3-methyl-5-t-butyl-1,2-phenylene dibenzoate, 3,5-diisopropyl-1,2-phenylenedibenzoate, 2-ethoxyethyl methyl carbonate, 2-ethoxyethyl ethyl carbonate, 2-propoxyethyl methyl carbonate, 2-benzyloxy ethyl phenyl carbonate, 5-t-butyl-1,2-phenylenediphenyl dicarbonate; 2-isopropyl-2-isobutyl-1,3-dimethoxypropane, 2-isopropyl-2-isopentyl-1,3-dimethoxypropane, 9,9-bis(methoxymethyl)fluorene, and the like.

In the method for manufacturing a solid catalyst component for polymerization of an olefin according to the present invention, when plural internal electron donor compounds are used, the combination of the internal electron donor compounds may be a combination of phthalic ester compounds different from each other, may be a combination of non-phthalate compounds different from each other, or may be a combination of a phthalic ester compound and a non-phthalate compound.

When plural internal electron donor compounds are used, preferable combinations of the internal electron donor compounds can include a combination selected from 2-ethoxyethyl ethyl carbonate and 2-isopropyl-2-isopentyl-1,3-dimethoxypropane, diethyl benzylidenemalonate and 2-isopropyl-2-isopentyl-1,3-dimethoxypropane, cyclohexane-1,2-dicarboxylic acid di-n-butyl and 2-isopropyl-2-isopentyl-1,3-dimethoxypropane, 2-ethoxyethyl ethyl carbonate and diethyl benzylidenemalonate, 2-ethoxyethyl ethyl carbonate and cyclohexane-1,2-dicarboxylic acid di-n-butyl, and diethyl benzylidenemalonate and cyclohexane-1,2-dicarboxylic acid di-n-butyl.

When two kinds of the internal electron donor compounds having adsorptivity to the magnesium compound different from each other are used in combination as the internal electron donor compound, used amounts thereof are as follows: a used amount ratio of an internal electron donor compound with weak solubility (strong adsorptivity) to an internal electron donor compound with strong solubility (weak adsorptivity) (internal electron donor compound with weak solubility (strong adsorptivity)/internal electron donor compound with strong solubility (weak adsorptivity)) is preferably 1/6 to 6/1, more preferably 1/5 to 5/1, and still more preferably 1/4 to 4/1 in terms of volume ratio.

In the method for manufacturing a solid catalyst component for polymerization of an olefin according to the present invention, the titanium halide compound and the internal electron donor compound are brought into contact with the preliminary contact product obtained after the polymer represented by general formula (I) described above is preliminarily brought into contact with the magnesium compound.

The order of contact of the titanium halide compound and the internal electron donor compound with the above-described preliminary contact product is not particularly limited. The titanium halide compound and the internal electron donor compound may be separately brought into contact with the above-described preliminary contact product or may be simultaneously brought into contact with the above-described preliminary contact product. In addition, each of the titanium halide compound and the internal electron donor compound may be added in the whole amount thereof in a lump or may be added in divided doses to contact with the above-described preliminary contact product, and the divided doses may be added continuously or intermittently. When the titanium halide compound or the internal electron donor compound is intermittently added in divided doses, addition intervals may be constant or may not be constant. An addition interval is preferably 1 minute to 60 minutes, more preferably 3 minutes to 30 minutes, and still more preferably 5 minutes to 15 minutes.

In the method for manufacturing a solid catalyst component for polymerization of an olefin according to the present invention, the preliminary contact product, the titanium halide compound, and the internal electron donor compound are preferably brought into contact with each other under an inert gas atmosphere to prepare the solid catalyst component.

Specifically, the solid catalyst component can be obtained by bringing the preliminary contact product, the titanium halide compound, and the internal electron donor compound into contact with each other while stirring in a vessel equipped with a stirrer under an inert gas atmosphere and under a situation where water and the like are removed, and subsequently reacting them at a predetermined temperature.

A temperature at which the preliminary contact product, the titanium halide compound, and the internal electron donor compound are brought into contact with each other may be within a relatively low temperature region around room temperature, when merely bringing the components into contact with each other, and stirring (mixing) the mixture, or dispersing or suspending the components to effect modification.

When a product is obtained through reaction after contacting the preliminary contact product, the titanium halide compound, and the internal electron donor compound, a temperature region from 40° C. to 130° C. is preferable. In this case, reaction is preferably performed after contacting each component, while keeping the temperature.

When the temperature at the time of obtaining the above-described product is less than 40° C., reaction does not sufficiently proceed, and the resultant solid catalyst component is hard to exert sufficient performance. In addition, when the above temperature exceeds 130° C., reaction is likely to be difficult to control since a solvent used significantly evaporate or the like.

A reaction time for obtaining the above-described product is preferably 1 minute or more, more preferably 10 minutes or more, and still more preferably 30 minutes or more.

An amount ratio to be used of each component for preparing the solid catalyst component varies according to preparation methods and therefore may be appropriately determined.

In the method for manufacturing a solid catalyst component for polymerization of an olefin according to the present invention, contents of titanium atoms, magnesium atoms, halogen atoms, and the internal electron donor compound constituting the solid catalyst component obtained are not particularly limited as long as the effect of the present invention can be exerted.

The obtained solid catalyst component contains titanium atoms at a proportion of preferably 1.0% to 10.0% by mass, more preferably 1.5% to 8.0% by mass, and still more preferably 1.5% to 5.0% by mass.

The obtained solid catalyst component contains magnesium atoms at a proportion of preferably 10.0% to 70.0% by mass, more preferably 10.0% to 50.0% by mass, still more preferably 15.0% to 40.0% by mass, and further preferably 15.0% to 25.0% by mass.

The obtained solid catalyst component contains halogen atoms at a proportion of preferably 20.0% to 90.0% by mass, more preferably 30.0% to 85.0% by mass, still more preferably 40.0% to 80.0% by mass, and further preferably 45.0% to 80.0% by mass.

The obtained solid catalyst component contains the internal electron donor compound at a proportion of preferably 0.5% to 30.0% by mass in total, more preferably 1.0% to 25.0% by mass in total, and still more preferably 2.0% to 20.0% by mass in total.

In the present application document, the content ratio of titanium atoms contained in the solid catalyst component means a value determined according to the method (oxidation-reduction titration) described in JIS 8311-1997 "Method for determination of titanium in titanium ores."

In the present application document, the content ratio of magnesium atoms contained in the solid catalyst component means a value determined by an EDTA titration method in which the solid catalyst component is dissolved in a hydrochloric acid solution and titrated with an EDTA solution.

In the present application document, the content of halogen atoms contained in the solid catalyst component means a value determined by a silver nitrate titration method in which the solid catalyst component is treated with a mixed solution of sulfuric acid and pure water to prepare an aqueous solution, a predetermined amount thereof is subsequently collected, and halogen atoms are titrated with a silver nitrate standard solution.

In addition, in the present application document, the content of the internal electron donor compound means a value obtained by hydrolyzing the solid catalyst, subsequently extracting the internal electron donor compound using an aromatic solvent, and subjecting this solution to measurement using a gas chromatography flame ionization detector (FID, hydrogen flame ionization type detector) method.

According to the method for manufacturing a solid catalyst component for polymerization of an olefin according to the present invention, by virtue of preliminarily bringing the magnesium compound and the compound represented by general formula (I) described above into contact with each other and subsequently bringing the obtained preliminary contact product, the titanium halide compound, and the internal electron donor compound into contact with each other, the content of the internal electron donor compound in the solid catalyst component can be easily controlled to fall within an appropriate range.

That is, in the method for manufacturing a solid catalyst component for polymerization of an olefin according to the present invention, when one kind of the internal electron donor compound is used alone, by virtue of preliminarily bringing the magnesium compound and the compound represented by general formula (I) described above into contact with each other, excessive adsorption of the internal electron donor compound to the magnesium compound is appropriately suppressed, and the proportion of active points with high stereospecificity in the solid catalyst component is thought to increase thereby.

In addition, in the method for manufacturing a solid catalyst component for polymerization of an olefin according to the present invention, when two or more kinds of the internal electron donor compound are used, by virtue of preliminarily bringing the magnesium compound and the compound represented by general formula (I) described above into contact with each other, excessive adsorption of an internal electron donor compound with strong adsorptivity to the magnesium compound is appropriately suppressed, causing adsorption of an internal electron donor compound with weak adsorptivity to the magnesium compound to be promoted, and the proportion of active points with high stereospecificity in the solid catalyst component is thought to increase thereby.

Consequently, in the method for manufacturing a solid catalyst component for polymerization of an olefin according to the present invention, a solid catalyst component which is capable of manufacturing a polymer of an olefin having high stereoregularity with a high yield when the solid catalyst component is used for polymerizing an olefin can be easily manufactured while easily controlling the content of the internal electron donor compound to fall within an appropriate range.

Next, a method for manufacturing a catalyst for polymerization of an olefin according to the present invention will be described.

The method for manufacturing a catalyst for polymerization of an olefin according to the present invention includes bringing a solid catalyst component for polymerization of an olefin obtained by the manufacturing method according to the present invention and an organic aluminum compound represented by general formula (II) below into contact with each other:

$$R^2_p AlQ_{3-p} \quad (II)$$

wherein, $R^2$ is an alkyl group having 1 to 6 carbon atoms, Q is a hydrogen atom or a halogen atom, p is a real number satisfying $0 < p \leq 3$, when two or more $R^2$ exist, each $R^2$ may be the same or different from each other, and when two or more Q exist, each Q may be the same or different from each other.

In the method for manufacturing a catalyst for polymerization of an olefin according to the present invention, details of the solid catalyst component for polymerization of an olefin obtained by the manufacturing method according to the present invention are as described above.

In the method for manufacturing a catalyst for polymerization of an olefin according to the present invention, the organic aluminum compound represented by general formula (II) includes one or more kinds selected from trialkyl aluminums such as triethylaluminum, triisopropyl aluminum, tri-n-butyl aluminum, tri-n-hexyl aluminum, and triisobutyl aluminum; alkylaluminum halides such as diethylaluminum chloride and diethylaluminum bromide; and the like.

Among these organic aluminum compounds, one or more kinds selected from alkylaluminum halides such as diethylaluminum chloride; trialkyl aluminums such as triethylaluminum, tri-n-butyl aluminum, and triisobutyl aluminum; and the like are preferable, and one or more kinds selected from triethylaluminum and triisobutyl aluminum are more preferable.

In the method for manufacturing a catalyst for polymerization of an olefin according to the present invention, it is preferable that an external electron donor compound is further mutually contacted with the solid catalyst component for polymerization of an olefin obtained by the manufacturing method according to the present invention and the organic aluminum compound represented by general formula (II).

In the method for manufacturing a catalyst for polymerization of an olefin according to the present invention, examples of the external electron donor compound can include one or more kinds of organic silicon compounds selected from a phenylalkoxysilane, an alkylalkoxysilane, a phenylalkylalkoxysilane, a cycloalkylalkoxysilane, a cycloalkylalkylalkoxysilane, an (alkylamino)alkoxysilane, an alkyl(alkylamino)alkoxysilane, an alkyl(alkylamino)silane, an alkylaminosilane, and the like.

Among them, one or more kinds selected from cyclohexylmethyl dimethoxysilane, dicyclopentyl dimethoxysilane, ethyltriethoxysilane, dicyclopentylbis(ethylamino)silane, cyclopentylcyclohexylbis(ethylamnino) silane, bis(perhydroisoquinolino)dimethoxysilane, diethylamino trimethoxysilane, or diethylamino triethoxysilene are more preferable.

In the method for manufacturing a catalyst for polymerization of an olefin according to the present invention, the catalyst for polymerization of an olefin may be prepared by contacting the solid catalyst component for polymerization of an olefin obtained by the manufacturing method according to the present invention, the organic aluminum compound represented by general formula (II), and the external electron donor compound as needed in the absence of an olefin, or the catalyst for polymerization of an olefin may be prepared by contacting them in the presence of an olefin (in a polymerization system) as described below.

While respective components constituting the catalyst for polymerization of an olefin described above are contacted in any order, it is desirable that the organic aluminum compound represented by general formula (II) described above is firstly charged into a polymerization system, the above-described external electron donor compound is subsequently charged thereinto and contacted, and then the solid catalyst component for polymerization of an olefin described above is charged thereinto and contacted, for example.

In the method for manufacturing a catalyst for polymerization of an olefin according to the present invention, each component is contacted at any ratio, and there is no limitation thereon as long as the effect of the present invention is not affected thereby.

Usually, a contact amount of the above-described organic aluminum compound represented by general formula (II) is preferably 1 to 2000 mol and more preferably 50 to 1000 mol per one mol of titanium atoms in the solid catalyst component for polymerization of an olefin described above.

In addition, in the catalyst for polymerization of an olefin obtained by the manufacturing method according to the present invention, a contact amount of the above-described external electron donor compound is preferably 0.002 to 10 mol, more preferably 0.01 to 2 mol, and still more preferably 0.01 to 0.5 mol per one mole of the above-described organic aluminum compound.

Respective contents of the solid catalyst component for polymerization of an olefin, the organic aluminum compound represented by general formula (II), and the external electron donor compound in the catalyst for polymerization of an olefin obtained by the manufacturing method according to the present invention preferably correspond to the contact amounts of respective components described above.

According to the present invention, a method for manufacturing a catalyst for polymerization of an olefin having excellent polymerization activity and capable of manufacturing a polymer excellent in stereospecificity can be provided.

Next, a method for manufacturing a polymer of an olefin according to the present invention will be described.

The method for manufacturing a polymer of an olefin according to the present invention includes polymerizing an olefin using a catalyst for polymerization of an olefin obtained by the manufacturing method according to the present invention.

In the method for manufacturing a polymer of an olefin according to the present invention, polymerization of an olefin may be homopolymerization or may be copolymerization with another α-olefin.

In the method for manufacturing a polymer of an olefin according to the present invention, an olefin to be polymerized can include one or more kinds selected from ethylene, propylene, 1-butene, 1-pentene, 4-methyl-1-pentene, vinylcyclohexane, and the like. Among these olefins, one or more kinds selected from ethylene, propylene, and 1-butene are preferable, and propylene is more preferable.

When the above-described olefin are propylene, propylene may be homoplymerized but may be copolymerized with another α-olefin.

An olefin copolymerized with propylene can include one or more kinds selected from ethylene, 1-butene, 1-pentene, 4-methyl-1-pentene, vinylcyclohexane, and the like.

When the catalyst for polymerization of an olefin is prepared in the presence of an olefin (in a polymerization system) in the above-described method for manufacturing a catalyst for polymerization of an olefin according to the present invention, the solid catalyst component for polymerization of an olefin, the organic aluminum compound represented by general formula (II), and the external electron donor compound optionally used are preferably contacted at the above-described amount ratios.

The method for manufacturing a polymer of an olefin according to the present invention may be performed in the presence or absence of an organic solvent.

In addition, olefin monomers such as propylene can be used in any of a gas state and a liquid state. A polymerization temperature is preferably 200° C. or less and more preferably 100° C. or less, and a polymerization pressure is preferably 10 MPa or less and more preferably 5 MPa or less. In addition, an olefin can be polymerized by any of a continuous polymerization method and a batch type polymerization method. Further, polymerization reaction may be performed in one stage or may be performed in two or more stages.

In addition, when an olefin is subjected to polymerization (also referred to as main polymerization) using the catalyst for polymerization of an olefin obtained by the manufacturing method according to the present invention, it is preferable to perform prepolymerization prior to main polymerization in order to further improve catalytic activity, stereoregularity, particle properties of a polymer produced, and the like. The same olefin as main polymerization or a monomer such as styrene can be used for the prepolymerization.

While respective components constituting the catalyst for polymerization of an olefin described above and monomers (olefin) are contacted in any order in prepolymerization, it is preferable that the organic aluminum compound is firstly charged into a prepolymerization system set to an inert gas atmosphere or an olefin gas atmosphere, the solid catalyst component for polymerization of an olefin obtained by the manufacturing method according to the present invention is subsequently charged thereinto and contacted, and then an olefin such as propylene is contacted alone or a mixture of the olefin such as propylene and one or more kinds of other olefins is contacted.

When the external electron donor compound is further charged into the prepolymerization system in the above-described prepolymerization, it is preferable that the organic aluminum compound is firstly charged into a prepolymerization system set to an inert gas atmosphere or an olefin gas atmosphere, the external electron donor compound is subsequently charged thereinto and contacted, the solid catalyst component for polymerization of an olefin obtained by the manufacturing method according to the present invention is further contacted therewith, and then an olefin such as propylene is contacted alone or a mixture of the olefin such as propylene and one or more kinds of other olefins is contacted.

In the method for manufacturing a polymer of an olefin according to the present invention, as a polymerization method, a slurry polymerization method using a solvent of an inert hydrocarbon compound such as cyclohexane and heptane; a bulk polymerization method using a solvent such as liquefied propylene; and a gas phase polymerization method, which is substantially solvent-free, can be exemplified, and a bulk polymerization method or a gas phase polymerization method is preferable.

When propylene and a monomer of another α-olefin are copolymerized, random copolymerization in which polymerization is carried out in one stage using propylene and a small amount of ethylene as a comonomer, and copolymerization so-called propylene-ethylene block copolymerization in which propylene is homopolymerized in a first stage (first polymerization vessel), and propylene and another α-olefin such as ethylene are copolymerized in a second stage (second polymerization vessel) or more stages (multistage polymerization vessel) are representative thereof, and block copolymerization of propylene and another α-olefin is preferable.

A block copolymer obtained by block copolymerization is a polymer including segments with two or more monomer compositions continuously changing and having a form in which two or more kinds of polymer chains (segments) having different primary structures such as monomer species, comonomer species, comonomer compositions, comonomer contents, comonomer sequences, stereoregularity, and the like are connected in one molecular chain.

In the method for manufacturing a polymer of an olefin according to the present invention, block copolymerization reaction between propylene and another α-olefin can be usually carried out by contacting propylene singly or contacting propylene and a small amount of an α-olefin (ethylene or the like) in a preceding stage and subsequently contacting propylene and an α-olefin (ethylene or the like) in a later stage, in the presence of a catalyst for polymerization of an olefin obtained in the manufacturing method according to the present invention. Polymerization reaction in the preceding stage described above may be repeatedly carried out two or more times, or polymerization reaction in the later stage described above may be repeatedly carried out two or more times by multistage reaction.

Specifically, in block copolymerization reaction between propylene and another α-olefin, it is preferable that polymerization is carried out with polymerization temperature and time adjusted such that a proportion of the polypropylene part (in a copolymer finally obtained) becomes 20% to 90% by mass in the preceding stage, and propylene and ethylene or another α-olefin are subsequently introduced to carry out polymerization such that a proportion of the part of rubber such as ethylene-propylene rubber (EPR) (in a copolymer finally obtained) becomes 10% to 80% by mass in the later stage.

Polymerization temperatures in both of the preceding stage and the later stage are preferably 200° C. or less, more preferably 100° C. or less, and still more preferably 75° C. to 80° C., and polymerization pressures are preferably 10 MPa or less, more preferably 6 MPa or less, and still more preferably 5 MPa or less.

Any of a continuous polymerization method and a batch type polymerization method can be employed, and polymerization reaction may be performed in one stage or may be performed in two or more stages also in the above-described copolymerization reaction.

In addition, a polymerization time (retention time in a reactor) is preferably one minute to five hours in each polymerization stage of the preceding stage or the later stage or also in the case of continuous polymerization.

As a polymerization method, a slurry polymerization method using a solvent of an inert hydrocarbon compound such as cyclohexane, heptane, and the like; a bulk polymerization method using a solvent such as liquefied propylene or the like; and a gas phase polymerization method, which is substantially solvent-free, are exemplified, and a bulk polymerization method or a gas phase polymerization method is preferable. Generally, reaction in the later stage is preferably gas phase polymerization reaction for the purpose of suppressing elution of EPR from PP particles.

According to the present invention, a method for manufacturing a polymer of an olefin capable of manufacturing a polymer excellent in stereospecificity with excellent polymerization activity can be provided.

Next, the present invention will be described more specifically by giving examples, but they are given for illustrative purposes only and do not limit the present invention.

EXAMPLES

Example 1

Into a round-bottom flask having a volume of 500 mL the inside of which was substituted by nitrogen gas (inert gas) and which was equipped with a stirrer were charged 20 g of diethoxy magnesium and 60 mL of toluene to form a toluene suspension of diethoxy magnesium. Thereafter, 2.0 g of a styrene-based copolymer having a styrene content ratio of 28% by mass (Compound A in which one terminal of SEPTON HG-252 ® manufactured by Kuraray Co., Ltd. is substituted with benzoyloxy group ($C_6H_5C(=O)O-$) (a compound in which $R^1$ is a phenyl group ($C_6H_5-$), X is a polymerization unit having a block structural unit (A) and a block structural unit (B) and having 2000 carbon atoms in total, and n+m=200 in general formula (I)) was added and contacted while stirring at 20° C. for 5 minutes to obtain a preliminary contact product.

A contact amount of Compound A to diethoxy magnesium described above (amount of Compound A/amount of diethoxy magnesium) was 1/10 in terms of mass ratio.

Thereafter, the whole amount of the above-described preliminary contact product (diethoxy magnesium-containing liquid) was added to a mixed solution of 50 mL of toluene and 40 mL of titanium tetrachloride, which had been preliminary charged into a round-bottom flask having a volume of 500 mL, equipped with a stirrer, and having been substituted by nitrogen gas, to prepare a suspension.

The temperature of the obtained suspension was increased to 100° C. while adding 8 mL of di-n-propyl phthalate thereto in the middle, followed by stirring at 100° C. for two hours.

Thereafter, supernatant was taken out, and washing was performed at 90° C. with 150 mL of toluene three times. A process in which 20 mL of titanium tetrachloride and 100 mL of toluene were added to the obtained reaction product, the temperature thereof was increased to 100° C. to perform reaction for 15 minutes was conducted twice, and washing was subsequently performed with 150 mL of n-heptane at 40° C. six times to obtain a solid catalyst component.

The content of titanium atoms and the content of di-n-propyl phthalate in the obtained solid catalyst component were 2.1% by mass and 13.5% by mass, respectively, and the terminal substituent of the above-described styrene-based copolymer was not contained.

<Contents of Halogen Atoms and Internal Electron Donor Compound in Solid Catalyst Component>

The content of halogen atoms in the solid catalyst component was measured by a silver nitrate titration method in which the obtained solid catalyst component was treated with a mixed solution of sulfuric acid and pure water to prepare an aqueous solution, a predetermined amount thereof was subsequently collected, and halogen atoms were titrated with a silver nitrate standard solution.

In addition, the content of the internal electron donor compound (di-n-propyl phthalate in Example 1) in the solid catalyst component was obtained by using a calibration curve determined based on known concentrations in advance when measurement was conducted under the following conditions using gas chromatography (GC-14B manufactured by SHIMADZU CORPORATION).

Each content was obtained by the same method also in the following Example and Comparative Examples.

[Measurement Conditions]
Column: capillary column (I. D. 0.32 mm×Length 30 m df 1.00 μm IntertCap1, manufactured by GL Sciences Inc.)
Detector: Flame Ionization Detector (FID, hydrogen flame ionization type detector)
Carrier gas: helium, flow rate 7 mL/minute
Measurement temperature: vaporization chamber 280° C., column 225° C., detector 280° C.

<Preparation of Catalyst for Polymerization of an Olefin and Polymerization of an Olefin>

After the internal atmosphere of an autoclave having an internal volume of 2.0 liters and equipped with a stirrer was substituted by nitrogen, 1.32 mmol of triethyl aluminum was firstly charged into the above-described autoclave, and 0.13 mmol of cyclohexylmethyl trimethoxysilane was then charged thereinto and contacted. Thereafter, the solid catalyst component for polymerization of an olefin obtained by the above-described method was charged in an amount of 0.00264 mmol in terms of titanium atom, and the inside of the above-described autoclave was kept at 20° C. for five minutes to prepare a catalyst for polymerization of an olefin.

Thereafter, 1.4 L of liquefied propylene and 67 mmol of hydrogen gas were charged into the autoclave with a stirrer including the catalyst for polymerization of an olefin described above, the temperature thereof was increased after prepolymerization was carried out at 20° C. for five minutes, and polymerization reaction was carried out at 70° C. for 60 minutes to obtain a propylene homopolymer (PP).

Polymerization activity (g-PP/(g-cat·hour)) at the time of forming the obtained propylene homopolymer was calculated according to the following equation. The result is shown in Table 1.

Polymerization activity of propylene homopolymerization (g-PP/(g-cat·hour))=PP amount obtained (g)/(mass of solid catalyst component included in catalyst for polymerization of an olefin (g)·one hour)

In addition, a percentage of the p-xylene soluble fraction (XS) in the obtained propylene homopolymer was measured.

<Percentage of p-Xylene Soluble Fraction (XS) in Polymer>

Into a flask provided with a stirring device were charged 4.0 g of the polymer (PP) and 200 mL of p-xylene, and the polymer was dissolved over two hours while keeping the temperature of p-xylene inside the flask below its boiling temperature (137° C. to 138° C.) by setting the external temperature to the boiling point of xylene or more (150° C.). Thereafter, the liquid temperature was cooled to 23° C. over one hour, and an insoluble component was separated from a soluble component by filtration. A solution of the above-described soluble component was collected, p-xylene was distilled away by drying with heat under a reduced pressure, the weight of the obtained residue was measured, and a relative ratio (mass %) based on the polymer (PP) produced was calculated to determine xylene soluble fraction (XS).

Comparative Example 1

A solid catalyst component was obtained in the same manner as Example 1 except that the above-described styrene-based copolymer with its terminal substituted was not added.

The content of titanium atoms and the content of di-n-propyl phthalate in the obtained solid catalyst component were 2.0% by mass and 13.8% by mass, respectively.

A catalyst for polymerization of an olefin was prepared in the same manner as Example 1 except that the obtained solid catalyst component was used, and propylene was subsequently homopolymerized.

Polymerization activity at the time of propylene homopolymerization and a percentage of the p-xylene soluble fraction (XS) in the polymer were obtained in the same methods as Example 1. Results are shown in Table 1.

Example 2

A solid catalyst component was obtained in the same manner as Example 1 except that a mixed liquid of 4 mL of di-n-propyl phthalate and 4 mL of 2-isopropyl-2-isopentyl-1,3-dimethoxypropane was added instead of 8 mL of di-n-propyl phthalate.

The content of titanium atoms, the content of 2-isopropyl-2-isopentyl-1,3-dimethoxypropane, and the content of di-n-propyl phthalate in the obtained solid catalyst component were 1.5% by mass, 6.7% by mass, and 7.6% by mass, respectively, and the terminal substituent of the above-described styrene-based copolymer was not contained.

A catalyst for polymerization of an olefin was prepared in the same manner as Example 1 except that the obtained solid catalyst component was used, and propylene was subsequently homopolymerized.

Polymerization activity at the time of propylene homopolymerization and a percentage of the p-xylene soluble fraction (XS) in the polymer were obtained in the same methods as Example 1. Results are shown in Table 1.

Comparative Example 2

A solid catalyst component was obtained in the same manner as Example 2 except that the above-described styrene-based copolymer with its terminal substituted was not added.

The content of titanium atoms, the content of 2-isopropyl-2-isopentyl-1,3-dimethoxypropane, and the content of di-n-propyl phthalate in the obtained solid catalyst component were 1.4% by mass, 7.6% by mass, and 8.7% by mass, respectively.

A catalyst for polymerization of an olefin was prepared in the same manner as Example 1 except that the obtained solid catalyst component was used, and propylene was subsequently homopolymerized.

Polymerization activity at the time of propylene homopolymerization and a percentage of the p-xylene soluble fraction (XS) in the polymer were obtained in the same methods as Example 1. Results are shown in Table 1.

Comparative Example 3

A solid catalyst component was obtained in the same manner as Example 1 except that 2.0 g of Compound B (SEPTON HG-252 ® manufactured by Kuraray Co., Ltd.) composed of a styrene-based copolymer in which one terminal thereof was not substituted with a functional group and which has a styrene content ratio of 28% by mass was added instead of the above-described styrene-based copolymer with its terminal substituted.

The content of titanium atoms and the content of di-n-propyl phthalate in the obtained solid catalyst component were 1.4% by mass and 7.3% by mass, respectively.

A catalyst for polymerization of an olefin was prepared in the same manner as Example 1 except that the obtained solid catalyst component was used, and propylene was subsequently homopolymerized.

Polymerization activity at the time of propylene homopolymerization and a percentage of the p-xylene soluble fraction (XS) in the polymer were obtained in the same methods as Example 1. Results are shown in Table 1.

Comparative Example 4

A solid catalyst component was obtained in the same manner as Example 2 except that 0.2 mL ethyl benzoate was added instead of the above-described styrene-based copolymer with its terminal substituted.

The content of titanium atoms, the content of 2-isopropyl-2-isopentyl-1,3-dimethoxypropane, the content of di-n-propyl phthalate, and the content of ethyl benzoate in the obtained solid catalyst component were 1.5% by mass, 6.9% by mass, 8.0% by mass, and 0.1% by mass, respectively.

A catalyst for polymerization of an olefin was prepared in the same manner as Example 1 except that the obtained solid catalyst component was used, and propylene was subsequently homopolymerized.

Polymerization activity at the time of propylene homopolymerization and a percentage of the p-xylene soluble fraction (XS) in the polymer were obtained in the same methods as Example 1. Results are shown in Table 1.

TABLE 1

| | Solid catalyst component for polymerization of an olefin | | | |
|---|---|---|---|---|
| | Target to be preliminarily contacted with magnesium compound | Internal electron donor compound | Polymerization activity (g-pp/g-cat · one hour) | Stereo-regularity XS(wt %) |
| Example 1 | Compound A | Donor A | 55,200 | 1.5 |
| Example 2 | Compound A | Donor A + Donor B | 60,100 | 1.3 |
| Comparative Example 1 | None | Donor A | 42,900 | 1.8 |
| Comparative Example 2 | None | Donor A + Donor B | 47,200 | 1.5 |
| Comparative Example 3 | Compound B | Donor A | 43,300 | 1.8 |
| Comparative Example 4 | Compound C | Donor A + Donor B | 53,900 | 1.5 |

Compound A: SEPTON HG-252(R) one terminal of which is substituted with benzoyloxy group ($C_6H_5C(=O)O-$)
Compound B: SEPTON HG-252(R)
Compound C: ethyl benzoate
Donor A: di-n-propyl phthalate
Donor B: 2-isopropyl-2-isopentyl-1,3-dimethoxypropane It is shown in Table 1 that in Example 1 and Example 2, since a solid catalyst component manufactured by bringing one or more kinds of internal electron donor compounds and a titanium halide compound into contact with each other after preliminary bringing a magnesium compound and a specific compound into contact with each other is used, excellent polymerization activity is exhibited when a solid catalyst component obtained is used for polymerizing an olefin, and stereoregularity of a polymer obtained is kept high.

From the above results, it is surmised that by virtue of preliminary adsorption of the compound represented by general formula (I) described above on a surface of the magnesium compound, an adsorption amount of the one or more kinds of internal electron donor compounds, which is allowed to contact later, to the solid catalyst surface is moderately controlled, and a ratio of active points excellent in stereospecificity and activity in the solid catalyst component increases.

On the other hand, in Comparative Example 1 to Comparative Example 4, it is found that since the specific compound is not preliminarily brought into contact with the magnesium compound or a compound to be preliminarily contacted is different from the compound defined in the present invention, polymerization activity when a solid catalyst component obtained is used for polymerization is low or stereoregularity of a polymer obtained is low.

INDUSTRIAL APPLICABILITY

According to the present invention, a method for manufacturing a solid catalyst component for polymerization of an olefin having excellent polymerization activity and capable of manufacturing a polymer excellent in stereospecificity, a method for manufacturing a solid catalyst for polymerization of an olefin, and a method for manufacturing a polymer of an olefin can be provided.

The invention claimed is:

1. A method for manufacturing a solid catalyst component for polymerization of an olefin, comprising: bringing a magnesium compound and a compound represented by general formula (I) below into contact with each other to obtain a preliminary contact product; and subsequently bringing the preliminary contact product, a titanium halide compound, and an internal electron donor compound into contact with each other to obtain a solid catalyst component for polymerization of an olefin,

[Formula 1]

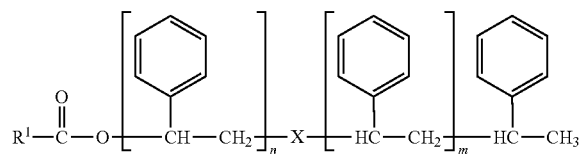

(I)

wherein, $R^1$ is any group selected from a linear alkyl group having 1 to 8 carbon atoms, a branched alkyl group having 3 to 8 carbon atoms, a cycloalkyl group having 3 to 8 carbon atoms, and an aromatic group having 6 to 12 carbon atoms, n and m each are an integer of 0 or more, n+m is 1 to 30,000, and X is a polymerization unit having a structural unit (A) below and a structural unit (B) below and having 9 to 50,000 carbon atoms in total.

[Formula 2]

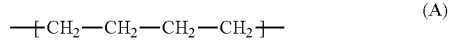

(A)

[Formula 3]

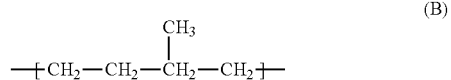

(B)

2. A method for manufacturing a catalyst for polymerization of an olefin, comprising bringing a solid catalyst component for polymerization of an olefin obtained by the method according to claim 1 and an organic aluminum compound represented by general formula (II) below into contact with each other:

$$R^2_p AlQ_{3-p}$$ (II)

wherein, $R^2$ is an alkyl group having 1 to 6 carbon atoms, Q is a hydrogen atom or a halogen atom, p is a real number satisfying $0 < p £ 3$, when two or more $R^2$ exist, each $R^2$ may be the same or different from each other, and when two or more Q exist, each Q may be the same or different from each other.

3. The method for manufacturing a catalyst for polymerization of an olefin according to claim 2, comprising bringing the solid catalyst component for polymerization of an olefin, an organic aluminum compound represented by general formula (II) below, and an external electron donor compound into contact with each other:

$$R^2_p AlQ_{3-p}$$ (II)

wherein, $R^2$ is an alkyl group having 1 to 6 carbon atoms, Q is a hydrogen atom or a halogen atom, p is a real number satisfying $0 < p £ 3$, when two or more $R^2$ exist, each $R^2$ may be the same or different from each other, and when two or more Q exist, each Q may be the same or different from each other.

4. A method for manufacturing a polymer of an olefin, comprising polymerizing an olefin using a catalyst for polymerization of an olefin obtained by the method according to claim 2.

5. A method for manufacturing a polymer of an olefin, comprising polymerizing an olefin using a catalyst for polymerization of an olefin obtained by the method according to claim 3.

\* \* \* \* \*